(12) United States Patent
Hed

(10) Patent No.: US 10,039,990 B2
(45) Date of Patent: Aug. 7, 2018

(54) REMOTELY CONTROLLABLE VEHICLES

(71) Applicant: Rovio Entertainment Ltd, Espoo (FI)

(72) Inventor: Mikael Hed, Espoo (FI)

(73) Assignee: ROVIO ENTERTAINMENT LTD., Espoo (FI)

( * ) Notice: Subject to any disclaimer, the term of this patent is extended or adjusted under 35 U.S.C. 154(b) by 25 days.

(21) Appl. No.: 14/501,118

(22) Filed: Sep. 30, 2014

(65) Prior Publication Data

US 2016/0091895 A1 Mar. 31, 2016

(51) Int. Cl.
| | |
|---|---|
| G05D 1/00 | (2006.01) |
| A63H 30/04 | (2006.01) |
| A63H 17/36 | (2006.01) |

(52) U.S. Cl.
CPC ............. *A63H 30/04* (2013.01); *A63H 17/36* (2013.01); *G05D 1/005* (2013.01); *G05D 1/0016* (2013.01)

(58) Field of Classification Search
CPC .... G05D 1/0022; G05D 1/0016; G05D 1/005; H04B 1/3822; H04B 1/3877; G08C 2201/93; G08C 2201/30; G08C 17/02; A63H 30/04
See application file for complete search history.

(56) References Cited

U.S. PATENT DOCUMENTS

| | | | | |
|---|---|---|---|---|
| 2006/0264185 A1* | 11/2006 | Jorgensen | ............... | G08C 17/02 455/103 |
| 2007/0293124 A1* | 12/2007 | Smith | .................... | A63H 17/02 446/454 |
| 2011/0275274 A1* | 11/2011 | Dewitt | ................... | A63H 30/04 446/456 |
| 2012/0015686 A1* | 1/2012 | Krupnik | ................ | H04W 88/02 455/550.1 |

FOREIGN PATENT DOCUMENTS

| | | |
|---|---|---|
| EP | 2 384 796 A1 | 11/2011 |
| KR | 2003-0038208 A | 5/2003 |
| WO | 2013/066892 A1 | 5/2013 |

OTHER PUBLICATIONS

European Search Report application No. EP14187051 dated Mar. 11, 2015.

* cited by examiner

*Primary Examiner* — Adam R Mott
(74) *Attorney, Agent, or Firm* — Squire Patton Boggs (US) LLP

(57) ABSTRACT

The invention relates to a system and a method for remote control of an unmanned electric ground vehicle provided with at least one electric engine and a control unit for at least one engine. The invention also relates to the use of a digital handheld device provided as a remote control unit. According to the invention, a receiver unit is functionally connected to a control unit in said vehicle for receiving commands remotely, as the remote control unit sends command signals to the vehicle. The remote control unit is configurable to store at least one instruction set for a vehicle, each instruction set having at least one command and at least one command parameter. The command parameter indicates a condition to be applied to a command in the instruction set, which will affect the command signal and thus the behavior of the vehicle.

25 Claims, 3 Drawing Sheets

REMOTELY CONTROLLABLE VEHICLES

FIELD OF INVENTION

The present invention relates to remote control of vehicles, such as toy cars and other unmanned ground vehicles.

BACKGROUND OF THE INVENTION

In the field of remote control of unmanned ground vehicles, perhaps the most common application known to everyone are slot cars running on a track. Slot cars are controlled with a handheld accelerator or throttle that is usually wired to conductive rails that transfers electricity to the car via electric shoe contacts riding on the rails. Another well-known application is radio controlled cars. Radio controlled cars are usually operated by a 27 or 49 MHz radio communication system, where different channels provide different information to the car for controlling speed, steering etc.

Digitalization has provided improved control technologies also in the field of remote control of toys, as in the system presented in EP 1583594A2, where multiple cars racing in a single slot may be addressed individually. Similarly, short range digital communication systems have entered the field of radio controlled cars, as can be seen e.g. in GB 2468126A, where a digital consumer device, like a mobile phone provided with a Bluetooth® connection, may be used as a radio control device for a toy. Taken further, as in KR 2013107405A, an application installed on a touch screen smart device may be used to control the direction and speed of a wirelessly operated device by recognizing the direction and moving distance of a touch or swipe on the touch screen. A fair assumption of where these and other developments is leading would be that also slot cars become increasingly wireless, i.e. radio controlled, and that the proprietary classic throttles may be replaced by smart digital devices.

The achievements in technology have made possible versatile and effective control systems of unmanned ground vehicles, such as toy cars. However, excitement and joy in playing with toy cars comes mostly from competition against others. A slot car track is almost by definition a racing ground, and also radio controlled vehicles lend themselves easily to various activities which competitive elements. While known solutions are focusing on control of individual devices, the very reason for acquiring such devices, i.e. having fun with others, has received less attention. There is thus a need for a solution that enhances the quality of the overall performance and payback of remote controlled toys and other ground vehicles in terms of competition and amusement through gaming with physical devices.

However, as especially RC cars continue to get more and more powerful, the control of the car becomes more difficult. This difficulty often renders the utility of the vehicle and/or results in damage to the vehicle. Accordingly, there exists a need more advanced approaches of controlling powerful toy cars. It is an object of the invention to introduce such control.

It is also an object of the invention to bring the experience of racing with toy cars at least closer to the level of car video and computer games, where car performance, environmental circumstances and other gaming parameters are controllable to a much greater extent than with present toy car systems.

SUMMARY OF THE INVENTION

According to a first aspect of the present invention, there is provided a system for remote control of an unmanned electric ground vehicle provided with at least one electric engine and a control unit for at least one engine. The inventive system comprises a receiver unit functionally connected to the control unit in for receiving commands remotely, and a remote control unit for sending command signals to the vehicle. The remote control unit is configurable to store at least one instruction set for a vehicle. Such a modular instruction set has at least one command and at least one command parameter indicating a condition to be applied to a command in the instruction. This combination of a command and a command parameter controls the behaviour of an unmanned electric ground vehicle by creating a range of variants of command signals that may be sent to the vehicle, to effect the same basic command in different ways. For example, the variations may in practice mean that e.g. acceleration, top speed or steering sensitivity values are different in different instruction sets.

The instruction set may have a set of predetermined command parameters indicating the conditions to be applied to a command. For example, a "novice" set of parameters applied to all commands in the instruction set, and perhaps eliminating some more extreme commands altogether, will offer an easy and unsurprising drive with the vehicle. In contrast, an "expert" set of parameters will render the vehicle or car much more "sporty" and extreme to its behaviour. Such parameter set may be referred to as "standard" sets of parameters readily available to the user upon purchase of the vehicle. Alternatively, in another embodiment, each command in an instruction set may have a specific command parameter associated with it. This allows for tailoring the driving properties of the vehicle exactly to the taste and skills of the user.

The remote control is a wireless remote control that may be based on a radio communication or an optical communication system. In embodiments, the remote control unit is a digital handheld device provided with a local or personal area network transmitter, and the receiver unit in said vehicle is provided with circuitry capable of receiving radio signals over a local or personal area network to effect wireless remote control of said vehicle. The remote control unit is configurable to execute the commands with the command parameters in the instruction set and to send the resulting control signals to the vehicle in order to effect remote control of said vehicle according to the parameters of the selected instruction set. For example, the parameters may make the response to a command input by the user of the remote control steeper or less steep, depending on the value of the parameter. This is necessarily not recognizable at the user interface which may be the same for all instruction sets; only the reactions to the commands as seen by the behaviour of the vehicle may be different.

In embodiments, the unmanned electric ground vehicle may include modules which are separately addressable by the commands of an instruction set. Thus at least one command and its associated command parameter controls the function of the addressed module in the vehicle. For example, separate add-on modules may include acceleration sensors, which make it possible for the control unit of the vehicle to take into account skidding when applying control signals to the engines of the vehicle. A power boost capacitor with a separate activation command in the instruction set may be a similar add-on module.

In embodiments the remote control unit may be a touch-screen display for receiving commands and for visualization of a control panel for entering commands. Such a remote control unit may also include the use of in-built sensors for sensing gestures of a user, and for translating them into at least one of the commands in an instruction set. Furthermore, the remote control unit may include transducers for providing tactile feedback to the user for at least one of the commands in an instruction set. Alternatively, the remote control unit may include a wired or wireless interface to an electro-mechanical manipulator, such as a traditional radio control console, for receiving commands.

The control platform, i.e. the software managing the various control functions, may reside in proprietary remote controllers or they may be applications downloaded into general-purpose digital smart devices, such as mobile phones. It is readily understood by one skilled in the art that modern digital handheld devices, such as smartphones, provide the required hardware as well as a suitable software platform to implement a remote control unit according to the invention. A smartphone may inherently be provided with a touch screen, gesture sensors, a vibrational unit for tactile feedback, and so on. Furthermore, the operating system and application development support of these devices makes it feasible to design and code the required functionalities a remote control unit based on the device as such. Regarding the radio control aspect itself, enabling technologies with a sufficient amount of bandwidth are any modern near field radio technologies, of which examples are given later on.

According to a second aspect of the invention a method for remote control of an unmanned electric ground vehicle is provided. The method comprises the steps of:
providing at least one instruction set for a vehicle, each instruction set having at least one command that may be used to control the vehicle;
providing at least one command parameter indicating a condition to be applied to said at least one command to determine the effect of that command on said vehicle;
storing in a memory of a remote control unit at least one instruction set for a vehicle and at least one command parameter indicating a condition to be applied to said at least one command within said instruction set;
sending a corresponding command signal based on said command and command parameter to said vehicle with said remote control unit;
receiving said command signal in said vehicle with a receiver unit functionally connected to said control unit;
executing said command signal to control the behaviour of said unmanned electric ground vehicle.

A further aspect of the invention concerns the use of a digital handheld device provided with a local or personal area network transmitter as a remote control unit according to the inventive system, to effect wireless remote control of an unmanned electric ground vehicle.

INDUSTRIAL APPLICABILITY

At least some embodiments of the present invention find industrial application in the field of games, entertainment, and in the control of unmanned ground vehicles in general. These may be toys or vehicles to be used where it is inconvenient, dangerous, or impossible to have a human operator present. The business model for a manufacturer may be based on a direct purchase of the hardware and/or software, or it may be a service provided over internet, with updates and upgrades available at a cost or for free. Likewise the gaming model may be a one-off purchase, or it may be a service provided over internet, with updates and upgrades available at a cost or for free, or against a certain level of achievement in a related game.

DETAILED DESCRIPTION OF EXAMPLE EMBODIMENTS

Figure 1:
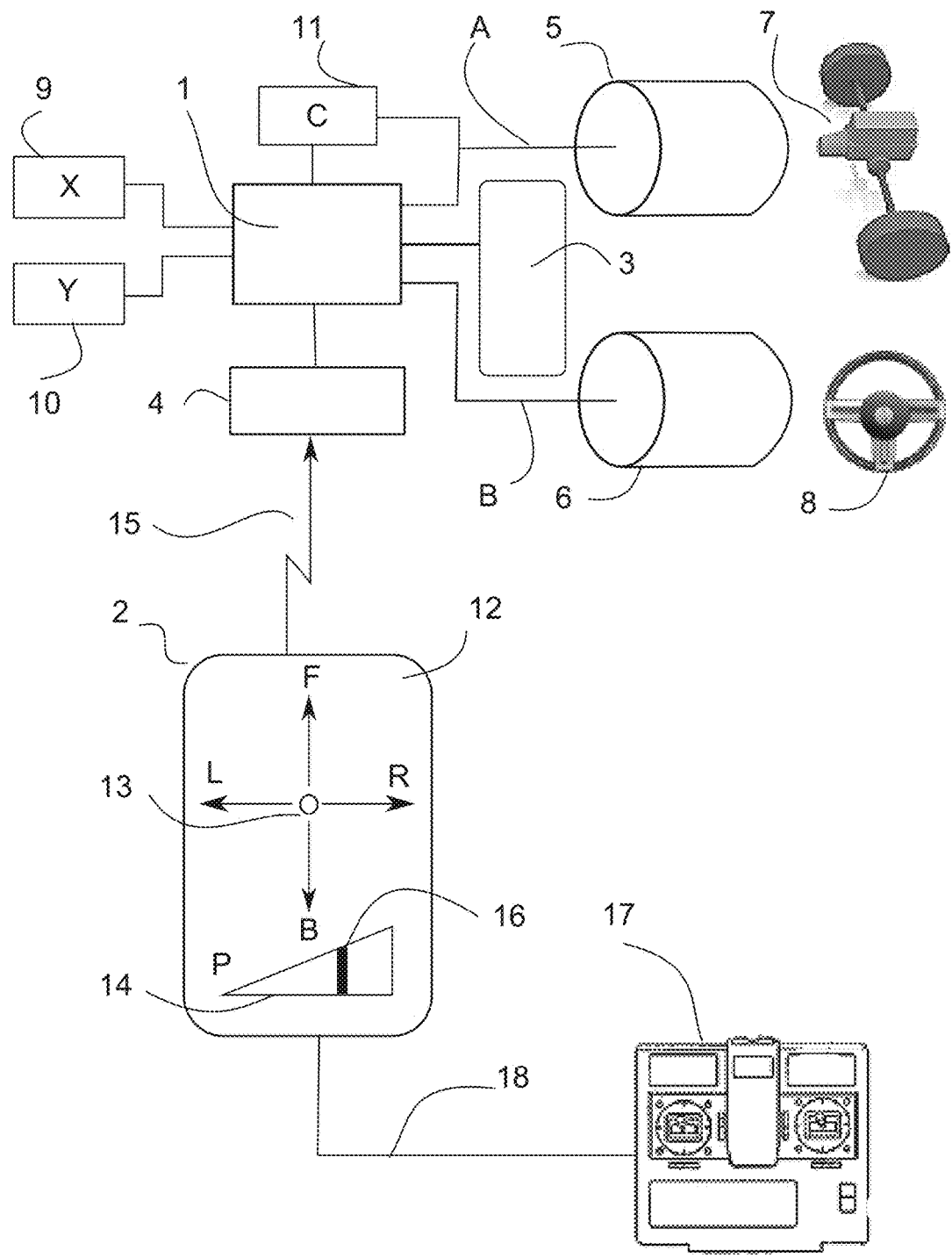
FIG. 1 illustrates an example of a toy car control system capable of supporting at least some embodiments of the present invention.

FIG. 1 shows a toy car control system supporting at least some embodiments of the invention. For the purpose of illustrating the invention and the functionalities of the control system, the car controlled by the system in FIG. 1 may be a radio controlled freely running car, or a slot track car with wireless control.

The core of the control system is a control unit 1 in the car and a receiver unit 4 for receiving wireless control signals from a remote control device 2 over a wireless link 15. The control unit 1 also receives input from acceleration sensors 9 and 10, which may be arranged orthogonally to sense the acceleration of the car in a lengthwise direction X and a transverse direction Y. On the output side, control unit 1 controls the energy fed from battery 3 via conductors A and B to the electric engines 5 and 6. Depending on the car, both engines may be connected to a drivetrain 7, or engine 5 may be connected to drivetrain 7 and engine 6 to the steering gear of the car, here symbolized by a steering wheel 8. The car may have more than two engines, should the functionality of the car so require. The control unit 1 may comprise a reduced instruction set microprocessor (RISC), such as the RX62x or RX63x series provided by Renesas Corporation, adapted to control the car and interface with the remote control unit 2 via the receiver unit 4.

The car may be fitted with a power boost unit 11, typically consisting of a capacitor C. This will upon a command from the control unit 1 release supplemental power over conductor A to the engine 5 that drives the drivetrain 7. The motor is thus boosted to turn a drive wheel faster than normal top speed by which the car moves under battery power.

The remote control device 2 may consist of a digital mobile phone or assistant with a touch-screen display 12. As shown in the figure, the control of the car may be handled by touching and sweeping the display with a fingertip, for example by touching any (or several) of the arrows F (Forward), B (Backwards or Brake) L (Left) or R (Right) and moving the finger further from or closer to the navigation center 13. The speed control 14 is working in a similar manner. The power sent to the drivetrain may be indicated by a black vertical bar 16 or similar indicator, that slides along the gauge in a horizontal direction according to the touching or sliding movements of the user's fingertip on the triangle-formed gauge or dial P.

The wireless link 15 established by the receiver unit 4 in the car end the remote control device 2 may be a paired wireless radio frequency (RF) connection, such as a Bluetooth® connection, or a communication based on any other feasible technology, such as WiFi, Wibree, Zigbee, Wireless USB, UWB (ultra wideband), etc. The receiver unit may thus include a chipset and appropriate software for a slave-mode Bluetooth connection, such as the nRF8001 provided by Nordic Semiconductor.

Additionally or optionally, the remote control unit may include a wired or wireless interface 18 to an electro-mechanical manipulator, such as a traditional game console 17, for receiving commands. A console would receive steering, power and other commands via manipulators, switches and levers typically built in such consoles. These commands would then be matched against the selected instructions set in the remote control unit 2 and translated to corresponding command signals to be sent to the vehicle.

Figure 2A:
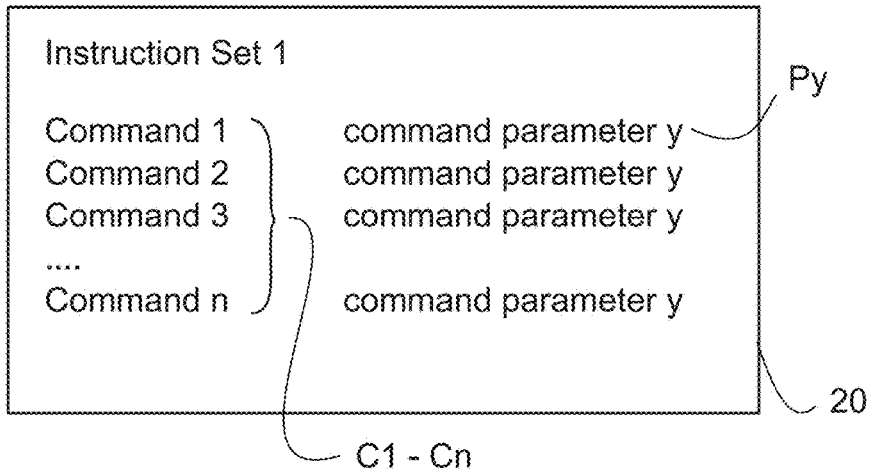
FIGS. 2a-2c show an embodiment of instruction sets which may be used to implement the inventive system and method.
Figure 2B:
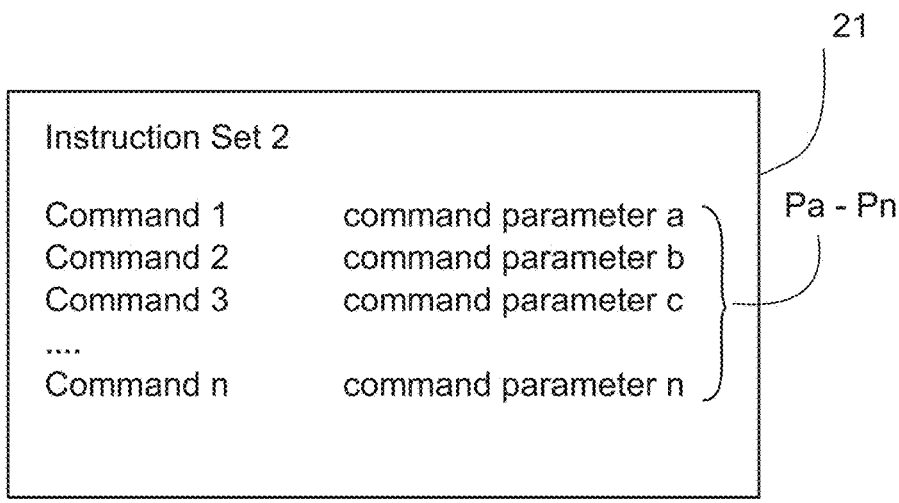
Figure 2C:
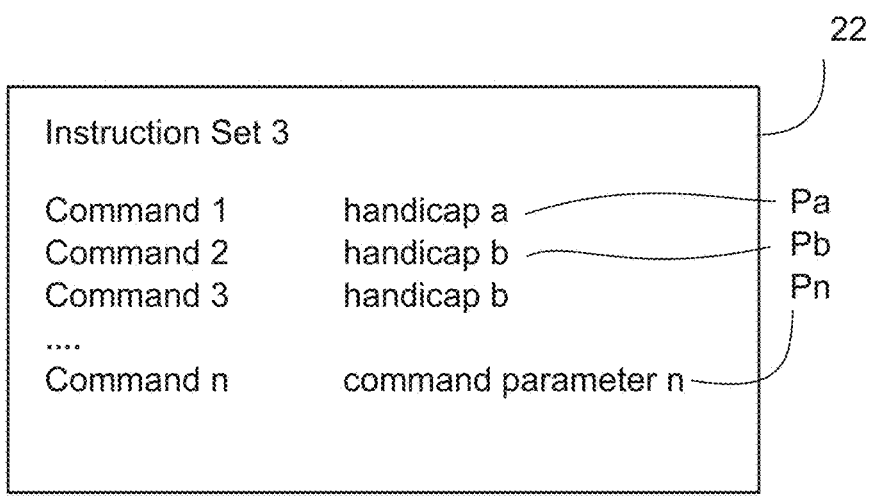

Turning now to FIGS. 2a-2c, they show an embodiment of instruction sets which are used to implement the system and method of the present invention. Each instruction set 20-22 consists of at least one command C1-Cn and at least one command parameter Py. An instruction set represents the collection of commands and command parameters defining the available controls of the vehicle for the time being. The vehicle may thus be driven with only one instruction set at a time. The number of available instruction sets is not limited, but the availability of them to a user may be subject to conditions, as will be explained later.

Each command C1-Cn corresponds to a control function of the remotely controlled vehicle. In the simplest case of only one command C1 in the instruction set, the command would relate to the speed control of the vehicle. This may be appropriate and sufficient in a simple slot track car. The corresponding command parameter may then dictate how much power is allowed to be fed to the drivetrain of the car. A beginner would have a command parameter, say Px, associated with the command C1 that allows only a modest amount of power to be used when driving. A mediocre player would have a parameter Py value allowing some more power, while an expert player may have a parameter value Pz allowing full power to be transferred to the driving wheels of the car. In this sense, the each user or player would enjoy racing the car according to his or her personal skills, without having the car flipped out of the track all too often.

In FIG. 2a is shown an Instruction Set 1 denoted by reference number 20, where there are n commands C1-Cn, each having the same command parameter Py. In this embodiment, the different commands may relate to e.g. power, steering, acceleration control and braking, power boost, skid control, etc. All commands having the same parameter Py would indicate that the instruction set is a standard and pre-defined instruction set intended for a player having medium-level skills, for example. Some commands may be disabled altogether by a parameter, e.g. the power boost unit 11 would not be available to the user if the corresponding command, e.g. C3, would have the beginner-level parameter value Px.

Referring now to FIG. 2b, each Command C1-Cn may have a different parameter value Pa-Pn. This allows for individual adjustment of the drive controls of the vehicle, whereby the value, the value range and the value interval of each parameter may be independently designed for each command. This may be beneficial in embodiments involving sophisticated vehicles requiring fine tuning of the driving properties to achieve the best performance.

In FIG. 2c is shown parameters Pa and Pb used as handicap parameters. This is an opposite idea of the user-lever classification explained in connection with FIG. 2a. In a "friendly" competition e.g. between family members, it may be useful to impose handicaps on users that are more experienced or much older than the youngest competitors. By using handicaps, some or all of the properties of the car of a superior user may be constricted, to allow the juniors of the competition a chance to win. Such handicap parameters may be mixed with other parameters, as illustrated by the parameter Pn assigned to the control command Cn.

Figure 3:
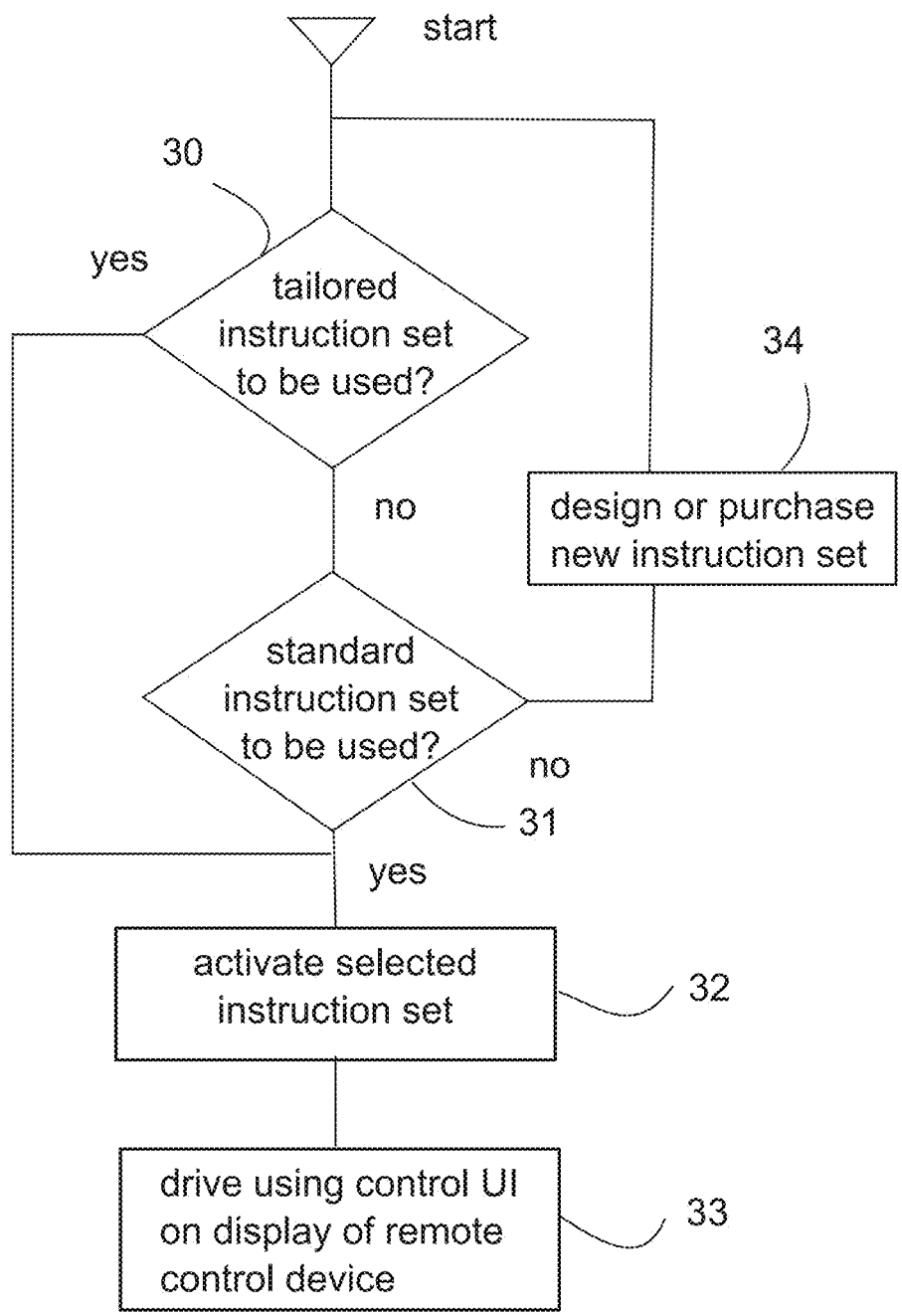
FIG. 3 shows a flowchart on the inventive concept.

In FIG. 3 is shown a flowchart on the inventive concept seen from a user's point of view. In step 30 and 31, the user decides whether or not a pre-saved instruction set is to be used. If a very personal one is to be chosen in step 30, the answer to that question is yes. If not, but a standard level instruction set, like beginner, intermediate or expert, or a particular handicap level is to be selected, the answer in step 31 is yes. In both cases, the next step at 32 would be to activate the selected instruction set on a computer. Browsing, selection and activation of instructions sets may also be facilitated by a website. Thereafter the driving may begin at step 33, using the available user interface on the remote control device.

In the case the user does not intend to use a pre-stored instruction set, he or she is about to design or purchase a new one at step 34. If the software is running e.g. on a handheld computer, such as a smartphone, the application allowing for the remote control may include an edit mode, where the commands and their associated parameters for an instruction set may be selected. It is however a fairly straightforward measure to arrange for a pairing of commands, like steering, speed etc. with relevant parameters such as steering sensitivity, power boost/no boost to a set to be stored and used to create command signals for a vehicle.

Alternatively, new instruction sets may at step 34 be purchased or fetched against game tokens from an internet site. Advancement in a game may bring the user access to download more advanced instruction sets, for example. Such a website may also assist in determining a suitable handicap for a competitor, and provide the corresponding instruction set. Furthermore, activation of built-in or add-on modules in the car may require access to a website to make them addressable by the remote control device.

If the car includes as module with acceleration sensors, they make it possible for the control unit of the vehicle to monitor and intervene in the car behaviour. If the acceleration module is activated, the control unit may e.g. reduce power applied by the engine to the wheels when the acceleration signal exceeds a threshold. In one example, in the case of a slot track car, the instruction set for a novice would thus help to avoid the car flipping out from the track. The control unit may also be operable to reduce power applied to an engine by pulse the power applied to one or more wheels of the car, to regain traction and avoid skidding. As mentioned before, a similar module would be a power boost capacitor having a separate activation command in the instruction set.

There may be more than one threshold for each direction X or Y (X=lateral in the lengthwise direction of the car or track, Y=lateral in the transverse direction) of acceleration, and each threshold may trigger different reactions, depending on the instruction set, or some thresholds or the whole sensor may be inactivated by the instruction set.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "embodiments" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of modules, technologies, features, etc., to provide a thorough understanding of embodiments of the invention. One skilled in the relevant art will recognize, however, that the invention can be practiced without one or more of the specific details, or with other methods, components, materials, etc. In other instances, well-known structures or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A system for remote control of an unmanned electric ground vehicle provided with at least one electric engine and a control unit for the at least one engine, the system comprising:
   a receiver unit functionally connected to said control unit in said vehicle for receiving commands remotely; and
   a remote control unit for sending command signals to said vehicle,
   wherein the remote control unit is configured to store at least one instruction set for the unmanned electric ground vehicle, the at least one instruction set comprising at least one of a pre-stored instruction set, a designed instruction set, or a purchased instruction set, and each of the at least one instruction set having at least one command and at least one command parameter indicating a condition to be applied to the at least one command in said instruction set to control a behaviour of said unmanned electric ground vehicle by affecting the corresponding command signal to be sent to said vehicle, wherein the at least one instruction set is chosen by a user before driving the vehicle based on a level of skill of the user,
   wherein a handicap within the at least one instruction set is selected by the user, before the driving of the vehicle, and wherein the handicap is configured to disable at least one of the at least one command altogether.

2. A system according to claim 1, wherein the remote control is a wireless remote control based on a radio communication system.

3. A system according to claim 1, wherein the remote control is a wireless remote control based on an optical communication system.

4. A system according to claim 1, wherein the at least one command parameter in the at least one instruction set is predetermined to indicate the conditions to be applied to the at least one command.

5. A system according to claim 1, wherein each of the at least one command in the at least one instruction set has a specific one of the at least one command parameter associated with it.

6. A system according to claim 1, wherein said unmanned electric ground vehicle includes modules which are separately addressable by the at least one command, whereby the at least one command and the associated at least one command parameter controls a function of an addressed module in said vehicle.

7. A system according to claim 1, wherein said remote control unit is a digital handheld device provided with a local or personal area network transmitter, and the receiver unit in said vehicle is provided with circuitry capable of receiving radio signals over said local or personal area network to effect wireless remote control of said vehicle.

8. A system according to claim 1, wherein the remote control unit is configured to execute the at least one command with the at least one command parameter in said instruction set and to send resulting control signals to said vehicle in order to effect remote control of said vehicle according to the parameters of the selected instruction set.

9. A system according to claim 1, wherein the remote control unit includes a touch-screen display for receiving the at least one command and for visualization of a control panel for entering of the at least one command.

10. A system according to claim 1, wherein the remote control unit includes an interface to an electro-mechanical manipulator configured to receive the at least one command.

11. A system according to claim 1, wherein the remote control unit includes sensors for sensing gestures of a user and for translating them into the at least one command in the instruction set.

12. A system according to claim 1, wherein the remote control unit includes transducers for providing tactile feedback to the user for the at least one command in the instruction set.

13. A method for remote control of an unmanned electric ground vehicle provided with at least one electric engine and a control unit for the at least one engine, the method comprising the steps of:
   providing at least one instruction set for the unmanned electric ground vehicle, the at least one instruction set comprising at least one of a pre-stored instruction set, a designed instruction set, or a purchased instruction set, and each of the at least one instruction set having at least one command configured to control the vehicle, wherein the at least one instruction set is chosen by a user before driving the vehicle based on a level of skill of the user;
   receiving, from the user before the driving of the vehicle, a selection of a handicap within the at least one instruction set, wherein the handicap is configured to disable at least one of the at least one command altogether;

providing at least one command parameter indicating a condition to be applied to said at least one command to determine an effect of the at least one command on said vehicle;

storing in a memory of a remote control unit the at least one instruction set for the vehicle and the at least one command parameter indicating the condition to be applied to said at least one command within said at least one instruction set;

sending a corresponding command signal based on said at least one command and the at least one command parameter to said vehicle with said remote control unit;

receiving said command signal in said vehicle with a receiver unit functionally connected to said control unit; and executing said command signal to control a behaviour of said unmanned electric ground vehicle.

14. A method according to claim 13, wherein the remote control of said unmanned electric ground vehicle is done with a radio communication system.

15. A method according to claim 13, wherein the remote control of said unmanned electric ground vehicle is done with an optical communication system.

16. A method according to claim 13, wherein the condition to be applied to the at least one command within the instruction set is predetermined by the at least one command parameter.

17. A method according to claim 13, wherein the condition to be applied to each of the at least one command within the instruction set is determined by the at least one command parameter specific to each of the at least one command.

18. A method according to claim 13, further comprising:
separately addressing modules of said unmanned electric ground vehicle by the at least one command in said instruction set, whereby the command signal based on said at least one command and its associated at least one command parameter controls a function of an addressed module in said vehicle.

19. A method according to claim 13, further comprising:
receiving the at least one command in the remote control unit via a touch-screen display which displays a control panel for entering the at least one command.

20. A method according to claim 13, further comprising:
sensing gestures of a user holding said remote control unit with sensors and translating the gestures into the at least one command in the instruction set.

21. A system according to claim 13, further comprising:
providing tactile feedback to the remote control unit with transducers for the at least one command in the instruction set.

22. A remote control unit for sending command signals to an unmanned electric ground vehicle,
wherein the remote control unit is configured to store at least one instruction set for the unmanned electric ground vehicle, the at least one instruction set comprising at least one of a pre-stored instruction set, a designed instruction set, or a purchased instruction set,
wherein each of the at least one instruction set comprises at least one command and at least one command parameter indicating a condition to be applied to the at least one command in said instruction set, wherein the at least one instruction set is chosen by a user before driving the vehicle based on a level of skill of the user,
wherein the at least one instruction set is configured to control a behaviour of said unmanned electric ground vehicle by affecting the corresponding command signal to be sent to said vehicle, and
wherein a handicap within the at least one instruction set is selected by the user, before the driving of the vehicle, and wherein the handicap is configured to disable at least one of the at least one command altogether.

23. A method for remote control of an unmanned electric ground vehicle, the method comprising:
providing at least one instruction set for the unmanned electric ground vehicle, the at least one instruction set comprising at least one of a pre-stored instruction set, a designed instruction set, or a purchased instruction set, and wherein each of the at least one instruction set comprises at least one command configured to control the vehicle;
providing at least one command parameter indicating a condition to be applied to said at least one command to determine an effect of the at least one command on said vehicle, wherein the at least one instruction set is chosen by a user before driving the vehicle based on a level of skill of the user;
receiving, from the user before the driving of the vehicle, a selection of a handicap within the at least one instruction set, wherein the handicap is configured to disable at least one of the at least one command altogether;
storing in a memory of a remote control unit the at least one instruction set for the vehicle and the at least one command parameter indicating the condition to be applied to said at least one command within said at least one instruction set; and
sending a corresponding command signal based on said at least one command and the at least one command parameter to said vehicle with said remote control unit.

24. A system for remote control of an unmanned electric ground vehicle provided with at least one electric engine and a control unit for the at least one engine, the system comprising:
a receiver unit functionally connected to said control unit in said vehicle for receiving at least one command, wherein the receiver unit is configured to receive a command signal from a remote control unit,
wherein the command signal is based on at least one instruction set for the unmanned electric ground vehicle, the at least one instruction set comprising at least one of a pre-stored instruction set, a designed instruction set, or a purchased instruction set, and each of the at least one instruction set comprising the at least one command and at least one command parameter indicating a condition to be applied to the at least one command in said instruction set to control a behaviour of said unmanned electric ground vehicle by affecting the corresponding command signal to be sent to said vehicle,
wherein the at least one instruction set is chosen by a user before driving the vehicle based on a level of skill of the user, and
wherein a handicap within the at least one instruction set is selected by the user before the driving of the vehicle, and wherein the handicap is configured to disable at least one of the at least one command altogether.

25. A method for remote control of an unmanned electric ground vehicle provided with at least one electric engine and a control unit for the at least one engine, the method comprising:

receiving a command signal in said vehicle with a receiver unit functionally connected to said control unit; and executing said command signal to control a behaviour of said unmanned electric ground vehicle, wherein said command signal is based on at least one instruction set for the unmanned electric ground vehicle, the at least one instruction set comprising at least one of a pre-stored instruction set, a designed instruction set, or a purchased instruction set, and each of the at least one instruction set having at least one command configured to control the vehicle, wherein said command signal comprises at least one command parameter indicating a condition to be applied to said at least one command to determine an effect of the at least one command on said vehicle, wherein the at least one instruction set is chosen by a user before driving the vehicle based on a level of skill of the user, and wherein a handicap within the at least one instruction set is selected by the user before the driving of the vehicle, and wherein the handicap is configured to disable at least one of the at least one command altogether.

* * * * *